US010344673B2

(12) United States Patent
Rambo

(10) Patent No.: US 10,344,673 B2
(45) Date of Patent: Jul. 9, 2019

(54) SYSTEM AND METHOD OF COOLING A TURBINE ENGINE

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 622 days.

(21) Appl. No.: 15/193,981

(22) Filed: Jun. 27, 2016

(65) Prior Publication Data

US 2017/0370291 A1 Dec. 28, 2017

(51) Int. Cl.
| | |
|---|---|
| F02C 7/18 | (2006.01) |
| F02C 7/12 | (2006.01) |
| F02C 7/232 | (2006.01) |
| F02C 6/08 | (2006.01) |
| F02C 9/52 | (2006.01) |
| F02C 6/16 | (2006.01) |

(52) U.S. Cl.
CPC .................. *F02C 7/18* (2013.01); *F02C 7/12* (2013.01); *F02C 7/185* (2013.01); *F02C 7/232* (2013.01); *F02C 6/08* (2013.01); *F02C 6/16* (2013.01); *F02C 9/52* (2013.01); *F05D 2260/232* (2013.01); *Y02T 50/675* (2013.01)

(58) Field of Classification Search
CPC .... F02C 3/30; F02C 3/305; F02C 6/08; F02C 6/16; F02C 7/12; F02C 7/1435; F02C 7/18; F02C 7/185; F02C 9/18; F02C 9/52; F05D 2260/232
See application file for complete search history.

(56) References Cited

U.S. PATENT DOCUMENTS

| | | | |
|---|---|---|---|
| 7,527,481 B2 | 5/2009 | Baryshnikov et al. | |
| 7,905,259 B2 | 3/2011 | Johnson et al. | |
| 7,921,869 B2 | 4/2011 | Surawski | |
| 8,079,407 B2 | 12/2011 | Fellague et al. | |
| 8,567,201 B2 | 10/2013 | Dalton | |

(Continued)

FOREIGN PATENT DOCUMENTS

| | | |
|---|---|---|
| EP | 0 903 484 A2 | 3/1999 |
| WO | 2013/116185 A1 | 8/2013 |

OTHER PUBLICATIONS

International Search Report and Written Opinion issued in connection with corresponding PCT Application No. PCT/US2017/029237 dated Jul. 11, 2017.

*Primary Examiner* — Scott J Walthour
(74) *Attorney, Agent, or Firm* — Dority & Manning, P.A.

(57) ABSTRACT

A cooling system for use with a turbine engine. The system includes a coolant reservoir configured to store cooling fluid therein, and a cooling device coupled in flow communication with the coolant reservoir, wherein the cooling device is configured to cool heated components of the turbine engine with the cooling fluid. The system further includes a first valve configured to control flow of the cooling fluid from the coolant reservoir towards the cooling device, and a controller coupled in communication with the first valve. The controller is configured to monitor an operational status of the turbine engine, and actuate the first valve into an open position after the turbine engine has been shut down such that the cooling fluid cools the heated components.

17 Claims, 5 Drawing Sheets

(56) References Cited

U.S. PATENT DOCUMENTS

| | | |
|---|---|---|
| 9,261,025 B2 | 2/2016 | Dooley |
| 9,366,180 B2 | 6/2016 | Birley et al. |
| 2003/0037547 A1 | 2/2003 | Bakran et al. |
| 2014/0020426 A1* | 1/2014 | Nold .................... F25J 3/04527 62/640 |
| 2015/0089953 A1 | 4/2015 | Ellsworth et al. |
| 2016/0311551 A1* | 10/2016 | Daniello ................ B64D 37/32 |

* cited by examiner

SYSTEM AND METHOD OF COOLING A TURBINE ENGINE

BACKGROUND

The present disclosure relates generally to turbine engines and, more specifically, to a post-shutdown cooling system for a turbine engine.

Turbine engines, such as turbofan engines, experience several different phases of operation including, but not limited to, startup to idle speed, warmup, acceleration to higher power and speed for takeoff, climb, cruise, deceleration to lower speed and power for descent, landing and taxi, shutdown, and cool-down. Turbine engines may cycle through the different phases of operation several times a day depending on the use of the aircraft to which the turbine engines are attached. For example, a commercial passenger aircraft typically shuts down its engines in between flights as passengers disembark from the aircraft. At shutdown, residual heat within the turbine engine can result in the formation of thermal hotspots and thermal gradients within the turbine engine. The thermal hotspots and thermal gradients can result in degradation and coking of fluids, such as fuel and oil, that remain in the turbine engine after shutdown. Moreover, thermal deformation caused by the residual heat can result in contact-related damage between the rotating and stationary components of the turbine engine during engine startup, thereby reducing the service life, performance, and operability of the turbine engine. In addition, special startup procedures or engine startup delays are sometimes implemented to reduce contact-related damage, which can result in increased startup time and delay between flights.

BRIEF DESCRIPTION

In one aspect, a cooling system for use with a turbine engine is provided. The system includes a coolant reservoir configured to store cooling fluid therein, and a cooling device coupled in flow communication with the coolant reservoir, wherein the cooling device is configured to cool heated components of the turbine engine with the cooling fluid. The system further includes a first valve configured to control flow of the cooling fluid from the coolant reservoir towards the cooling device, and a controller coupled in communication with the first valve. The controller is configured to monitor an operational status of the turbine engine, and actuate the first valve into an open position after the turbine engine has been shut down such that the cooling fluid cools the heated components.

In another aspect, a turbine engine is provided. The turbine engine includes a source of cooling fluid, a coolant reservoir configured to store cooling fluid therein, and a cooling device coupled in flow communication with the coolant reservoir, wherein the cooling device is configured to cool heated components of the turbine engine with the cooling fluid. The system further includes a first valve configured to control flow of the cooling fluid from the coolant reservoir towards the cooling device, and a controller coupled in communication with the first valve. The controller is configured to monitor an operational status of the turbine engine, and actuate the first valve into an open position after the turbine engine has been shut down such that the cooling fluid cools the heated components.

In yet another aspect, a method of cooling a turbine engine is provided. The method includes monitoring an operational status of the turbine engine, and cooling heated components of the turbine engine with a cooling fluid stored in a coolant reservoir after the turbine engine is shut down.

DRAWINGS

These and other features, aspects, and advantages of the present disclosure will become better understood when the following detailed description is read with reference to the accompanying drawings in which like characters represent like parts throughout the drawings, wherein.

Figure 1:
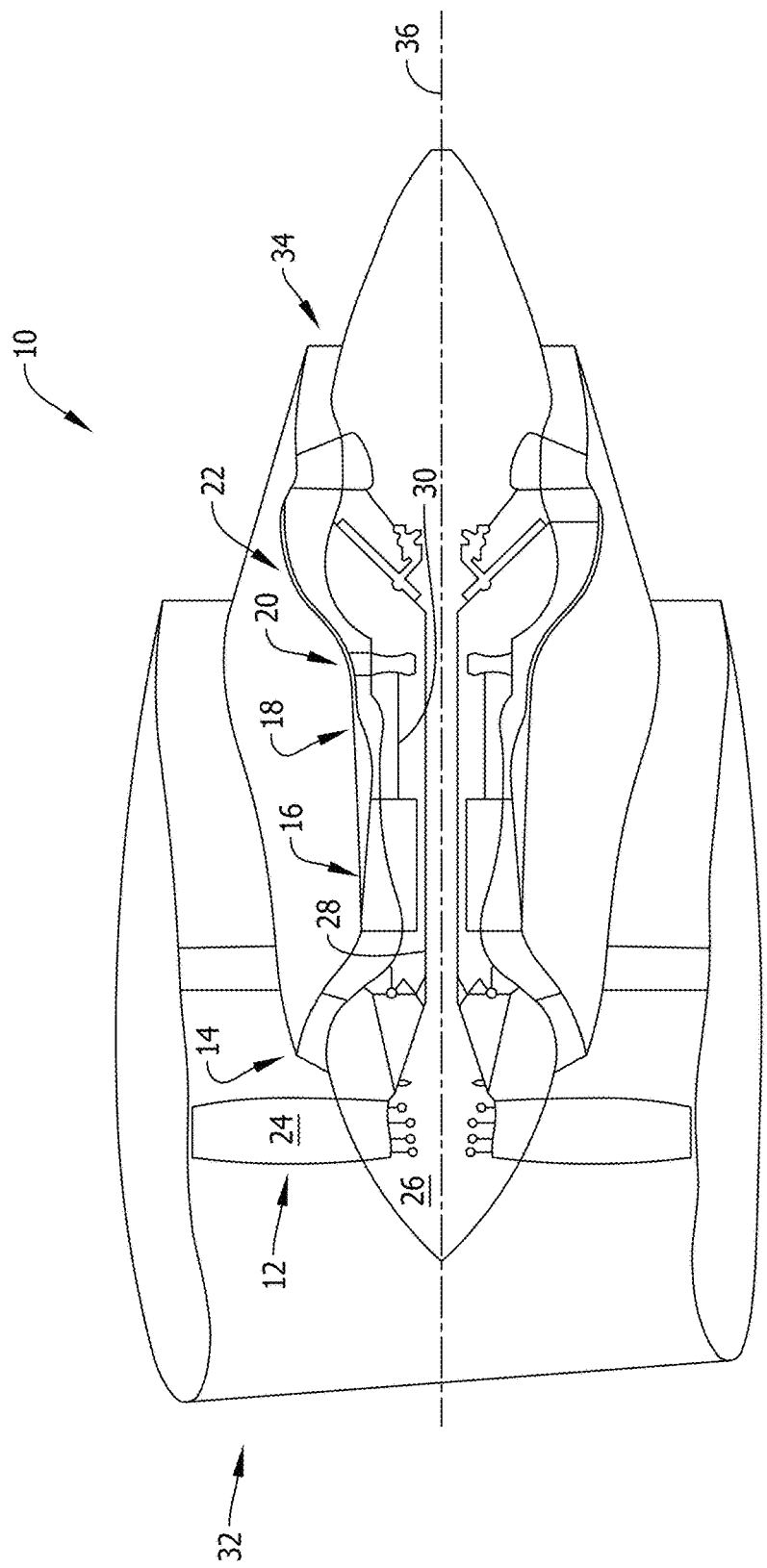
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a post-shutdown cooling system for a turbine engine. In the exemplary embodiment, the cooling system includes a coolant reservoir for storing cooling fluid therein, and a cooling device for cooling heated components of the turbine engine with the cooling fluid. The system executes a cooling cycle based on an operational status of the turbine engine. For example, the coolant reservoir is filled with a predetermined amount of cooling fluid before engine shutdown, and the cooling fluid is provided to the cooling device after engine shutdown. The cooling fluid is derived from onboard the turbine engine such that the cooling fluid within the coolant reservoir is capable of being filled or replenished in-situ. The cooling device then provides targeted spot cooling to the heated components of the turbine engine. As such, the cooling rate of the turbine engine is controlled, which facilitates reducing engine startup time, fuel and oil coking, and damage to the heated components of the turbine engine.

While the following embodiments are described in the context of a turbofan engine, it should be understood that the systems and methods described herein are also applicable to turboprop engines, turboshaft engines, turbojet engines, ground-based turbine engines, and any other turbine engine or machine that compresses working fluid and where cooling after shutdown is desired.

FIG. 1 is a schematic illustration of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
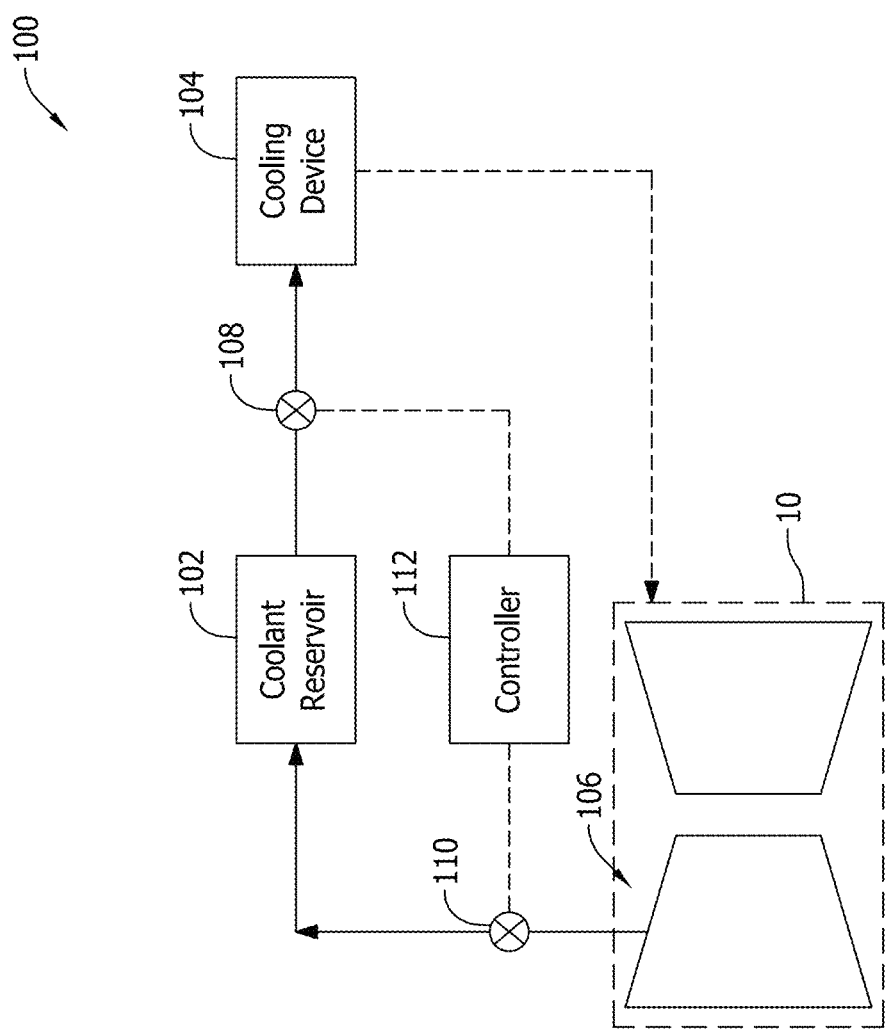
FIG. 2 is a schematic illustration of an exemplary cooling system that may be used with the turbine engine shown in FIG. 1.

FIG. 2 is a schematic illustration of an exemplary cooling system 100 that may be used with turbine engine 10. In the exemplary embodiment, cooling system 100 includes a coolant reservoir 102 and a cooling device 104 coupled in communication with coolant reservoir 102. Coolant reservoir 102 stores cooling fluid therein for later use, and cooling device 104 cools one or more heated components of turbine engine 10 with the cooling fluid after engine shutdown, as will be described in more detail below. Exemplary heated components of turbine engine 10 include, but are not limited to, rotating components of turbine engine 10, such as drive shafts 28 and 30, electrical components of turbine engine 10, a combustor case or liner of combustor assembly 18, a fuel manifold, a gear box, an oil sump, an engine frame, a casing, and a fuel drainage reservoir, when applicable.

Cooling device 104 may be embodied as any device capable of facilitating heat transfer between the cooling fluid and heated components of turbine engine 10. In one embodiment, cooling device 104 is embodied as a spray system that discharges a flow of cooling fluid for direct impingement against the heated components. Alternatively, cooling device 104 is embodied as a heat sink device coupled directly to the heated components. The heat sink device includes piping for receiving the flow of cooling fluid such that heat is transferred between the cooling fluid and the heated components via the heat sink device.

In the exemplary embodiment, coolant reservoir 102 receives the cooling fluid from a source 106 of cooling fluid. As shown in FIG. 2, source 106 of cooling fluid includes a compressor assembly of turbine engine 10, such as booster compressor assembly 14 (shown in FIG. 1). In such an embodiment, the cooling fluid is bleed air drawn from booster compressor assembly 14 during operation of turbine engine 10. In an alternative embodiment, the source of cooling fluid is a removable and selectively replaceable cartridge or container that contains the cooling fluid therein. In a further alternative embodiment, coolant reservoir 102 is recharged when an aircraft in which turbine engine 10 is attached is on the ground and before takeoff.

As shown, coolant reservoir 102 is a vessel installed within turbine engine 10 for the purpose of storing cooling fluid therein. In an alternative embodiment, coolant reservoir 102 is an existing component onboard turbine engine 10, such as a heat exchange device (not shown) configured to receive cooling fluid therein. In such an embodiment, the heat exchange device includes an intake line for channeling bleed air from drawn from booster compressor assembly 14, a first discharge line embodied as a cold return line (for standard heat exchanger operation), and a second discharge line for channeling cooling fluid towards cooling device 104. Valves coupled along the first and second discharge lines are selectively actuatable based on the operating condition of turbine engine 10 for cooling the heated components.

Cooling system 100 further includes a series of valves for controlling the flow of cooling fluid channeled through cooling system 100. In the exemplary embodiment, a first valve 108 is positioned between coolant reservoir 102 and cooling device 104, and a second valve 110 is positioned upstream from coolant reservoir 102 between coolant reservoir 102 and source 106 of cooling fluid. First valve 108 and second valve 110 are two-position valves (e.g., valves that can be either opened or closed). Alternatively, first valve 108 and second valve 110 are multi-position valves capable of actuation into intermediate positions between a fully closed position and a fully open position.

Cooling system 100 also includes a controller 112 coupled, either by wired or wireless connectivity, in communication with the series of valves, such as first valve 108 and second valve 110. In one embodiment, controller 112 is onboard turbine engine 10, and is embodied as a full authority digital engine control (FADEC) system. In an alternative embodiment, the series of valves are controlled by a computing device onboard an aircraft (not shown) in which turbine engine 10 is attached. In addition, in an alternative embodiment, the series of valves are controlled manually, or are spring-loaded valves held closed with a back-pressure induced by systems of turbine engine 10 and that actuate when the systems are shutdown.

Controller 112 is coupled in communication with the series of valves to control operation of cooling system 100. Controller 112 includes a memory and a processor, comprising hardware and software, coupled to the memory for executing programmed instructions. The processor may include one or more processing units (e.g., in a multi-core configuration) and/or include a cryptographic accelerator (not shown). Controller 112 is programmable to perform one or more operations described herein by programming the memory and/or processor. For example, the processor may be programmed by encoding an operation as executable instructions and providing the executable instructions in the memory.

The processor may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor, cause the processor to perform at least a portion of the functions described herein. The above examples are exemplary only, and thus are not intended to limit in any way the definition and/or meaning of the term processor.

The memory is one or more devices that enable information such as executable instructions and/or other data to be stored and retrieved. The memory may include one or more computer-readable media, such as, without limitation, dynamic random access memory (DRAM), synchronous dynamic random access memory (SDRAM), static random access memory (SRAM), a solid state disk, and/or a hard disk. The memory may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by the processor to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 112 to permit access and/or execution by the processor. In an alternative implementation, the computer-readable media is not removable.

In operation, cooling system 100 is set to a baseline configuration when the aircraft in which turbine engine 10 is attached is in flight. In the baseline configuration, first valve 108 and second valve 110 are closed. Controller 112 monitors an operational status of turbine engine 10 and, at some point before turbine engine 10 is shutdown, controller 112 commands second valve 110 to actuate into an open position such that coolant reservoir 102 is provided with the cooling fluid channeled from source 106 of cooling fluid. Controller 112 determines when to command second valve 110 to actuate into the open position based on the operational status of turbine engine 10. For example, in one embodiment, controller 112 commands second valve 110 to actuate into the open position when the bleed air is not being used to cool other subsystems of turbine engine 10 (e.g., during cruise or descent of the aircraft). Controller 112 then commands second valve 110 to actuate into the closed position when coolant reservoir 102 is filled with a predetermined amount of cooling fluid.

As described above, residual heat within turbine engine 10 can create thermal hotspots and thermal gradients therein after engine shutdown. As such, controller 112 controls actuation of first valve 108 to selectively cool portions of turbine engine 10. More specifically, controller 112 commands first valve 108 to actuate into an open position after turbine engine 10 has been shut down such that the cooling fluid is channeled from coolant reservoir 102 towards cooling device 104 for cooling the heated components. In one embodiment, controller 112 commands first valve 108 to actuate into the open position when controller 112 receives a full stop command for turbine engine 10 and a rotational speed of turbine engine 10 decreases. Alternatively, controller 112 commands first valve 108 to actuate into the open position at a preset time after controller 112 receives the full stop command. In addition, alternatively, controller 112 commands first valve 108 to actuate into the open position when a temperature within turbine engine 10 is greater than a predetermined threshold. For example, in one embodiment, the predetermined threshold is selected such that first valve 108 is actuated into the open position to mitigate an unexpected overheated state of turbine engine 10, even while in flight.

Figure 3:
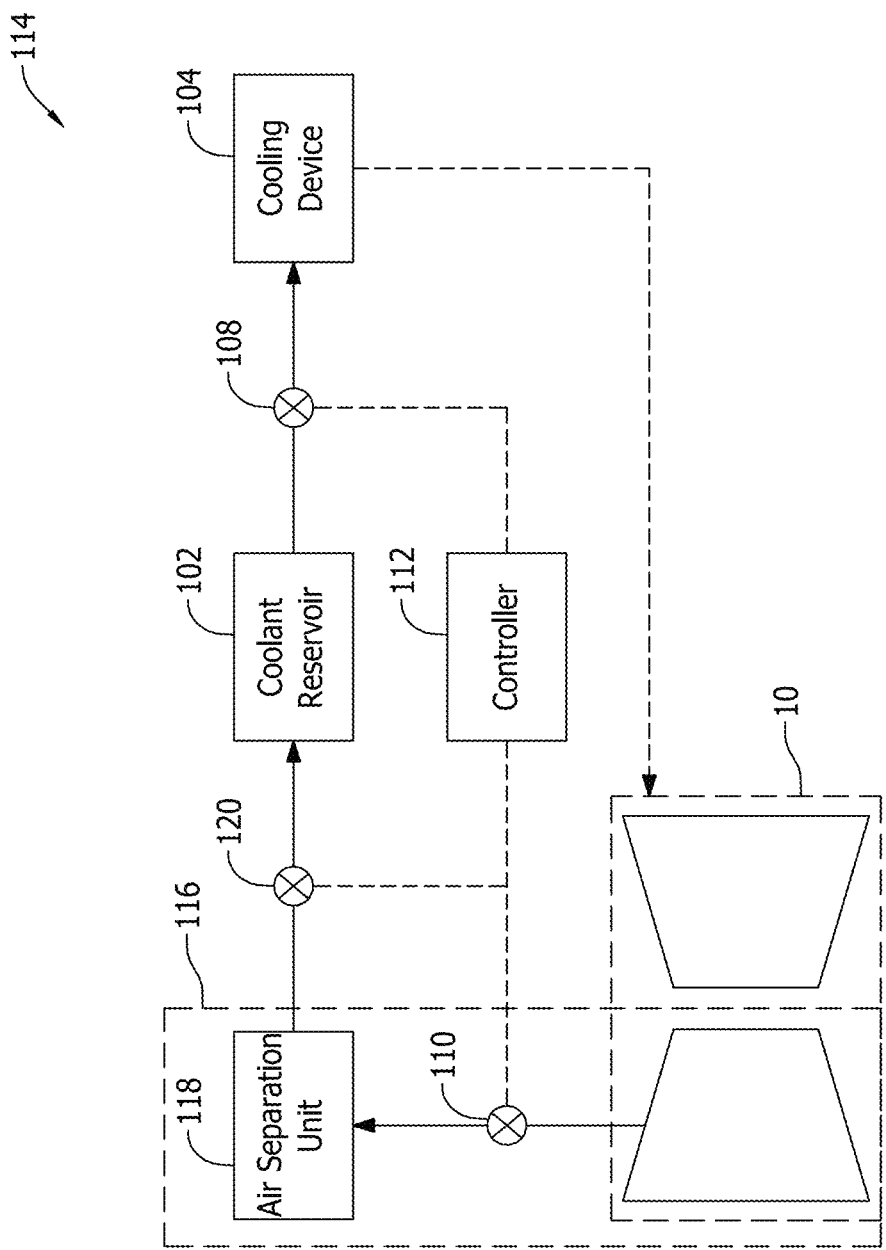
FIG. 3 is a schematic illustration of an alternative cooling system that may be used with the turbine engine shown in FIG. 1.

FIG. 3 is a schematic illustration of an alternative cooling system 114 that may be used with turbine engine 10. In the exemplary embodiment, cooling system 114 includes a source 116 of cooling fluid. Source 116 of cooling fluid includes the compressor assembly of turbine engine 10, such as booster compressor assembly 14 (shown in FIG. 1), and an air separation unit 118 coupled between coolant reservoir 102 and the compressor assembly. Air separation unit 118 is coupled in flow communication with coolant reservoir 102 and the compressor assembly. Moreover, as will be described in more detail below, air separation unit 118 separates at least one of nitrogen or carbon dioxide from the bleed air. As such, air separation unit 118 facilitates forming an inert cooling fluid for use when spraying the cooling fluid towards a fuel manifold, for example.

In the exemplary embodiment, air separation unit 118 is an adsorption-type unit (e.g., pressure swing adsorption) capable of separating components of the bleed air into separate streams. For example, in one embodiment, air separation unit 118 captures a first fluid from the air at a first pressure, and separated air is discharged from air separation unit 118. Cooling fluid (i.e., the first fluid) derived from the bleed air is released from adsorptive material within air separation unit 118 at a second pressure lower than the first pressure, and channeled towards coolant reservoir 102. Air separation unit 118 contains any adsorptive material that enables cooling system 114 to function as described herein. Exemplary adsorptive material includes, but is not limited to, an amine-based material and physical sorbents, such as a carbonaceous material and a zeolite material. Cooling system 114 further includes a third valve 120 is positioned between coolant reservoir 102 and air separation unit 118.

In operation, cooling system 114 is set to a baseline configuration when the aircraft in which turbine engine 10 is attached is in flight. In the baseline configuration, first valve 108, second valve 110, and third valve 120 are closed. Controller 112 monitors an operational status of turbine engine 10 and, at some point before turbine engine 10 is shutdown, controller 112 commands second valve 110 to actuate into an open position such that bleed air is channeled towards air separation unit 118. In one embodiment, third valve 120 remains in the closed position to facilitate implementing a residence time for the bleed air within air separation unit 118 sufficient to separate the cooling fluid from the bleed air. For example, air separation unit 118 receives the flow of bleed air from the compressor assembly, separates the cooling fluid from the bleed air, and provides the cooling fluid to coolant reservoir 102. More specifically, controller 112 monitors the residence time of the bleed air within air separation unit 118, and commands third valve 120 to actuate into an open position when the residence time has expired. As such, the cooling fluid is channeled towards coolant reservoir 102 and controller 112 commands second valve 110 and third valve 120 to actuate into the closed position when coolant reservoir 102 is filled with a predetermined amount of cooling fluid.

Figure 4:
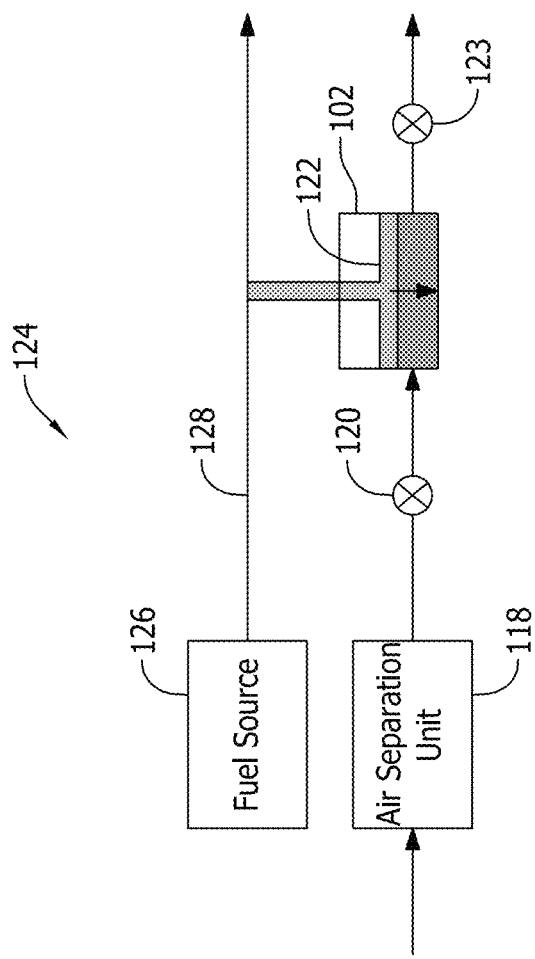
FIG. 4 is a schematic illustration of an exemplary compression device that may be used with the cooling system shown in FIG. 3.

FIG. 4 is a schematic illustration of an exemplary compression device 122 that may be used with cooling system 114 (shown in FIG. 3). In the exemplary embodiment, coolant reservoir 102 includes compression device 122 for compressing the cooling fluid contained therein for forming supercritical fluid within coolant reservoir 102 or for simply pressurizing the cooling fluid. For example, when air separation unit 118 (shown in FIG. 1) is configured to separate carbon dioxide from the bleed air, compression device 122 facilitates forming supercritical carbon dioxide for use as the cooling fluid. Pressurizing the carbon dioxide facilitates increasing the cooling efficiency of the cooling fluid. Cooling system 114 further includes a stop valve 123 coupled downstream from coolant reservoir 102. Stop valve 123 is in a closed position when pressurizing the cooling fluid such that the cooling fluid is contained within coolant reservoir 102.

In one embodiment, turbine engine 10 further includes a fuel supply system 124 that includes a fuel source 126 and a fuel supply line 128 coupled in flow communication with compression device 122. In normal operation of turbine engine 10, fuel supply line 128 is pressurized at as pressure greater than the critical pressure of carbon dioxide. As such, fuel supply line 128 is used to pressurize compression device, thereby forming supercritical carbon dioxide for use as the cooling fluid. In an alternative embodiment, the carbon dioxide is pressurized to a supercritical state using any arrangement that enables cooling system 114 to function as described herein.

Figure 5:
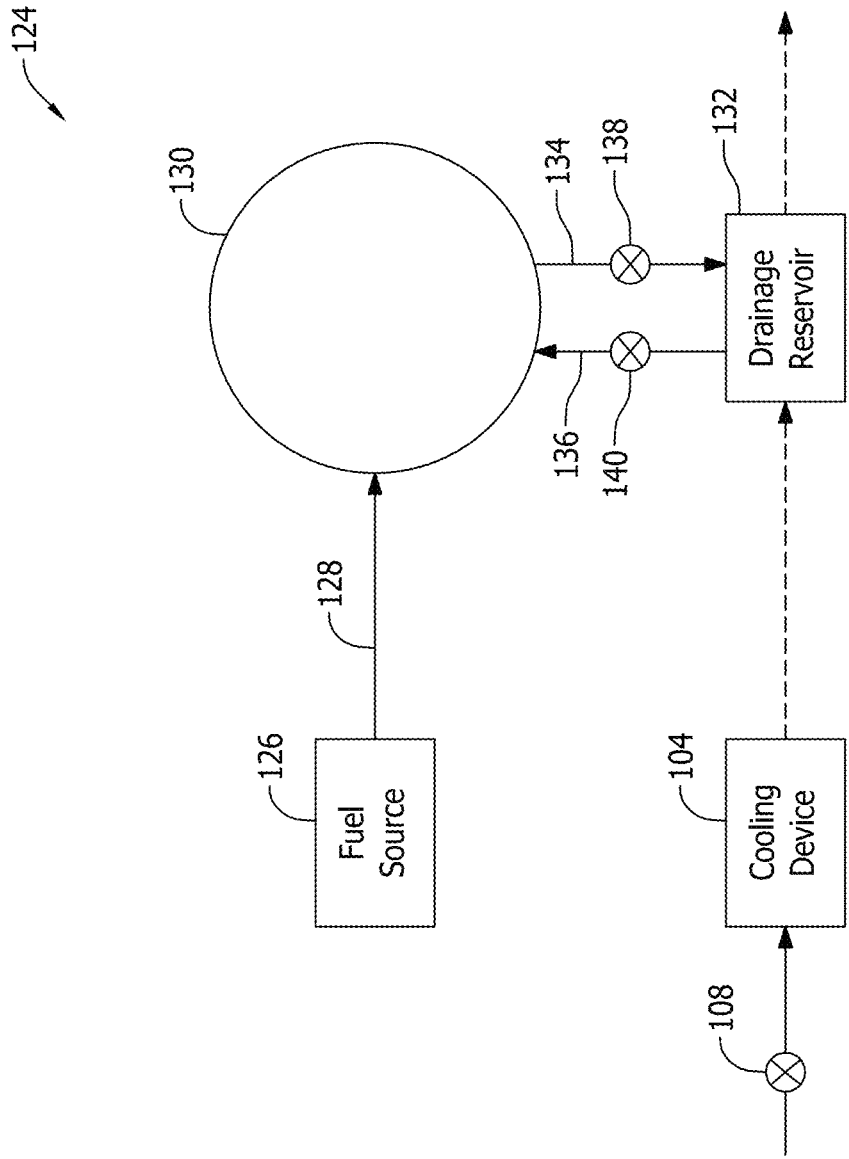
FIG. 5 is a schematic illustration of an exemplary fuel supply system that may be used with the turbine engine shown in FIG. 1.

FIG. 5 is a schematic illustration of an exemplary fuel supply system 124 that may be used with turbine engine 10 (shown in FIG. 1). In the exemplary embodiment, fuel supply system 124 includes fuel source 126, fuel supply line 128 coupled in flow communication with fuel source 126, and a fuel manifold 130 coupled in flow communication with fuel supply line 128. As shown, turbine engine 10 also includes a drainage reservoir 132 coupled in flow communication with fuel manifold 130. More specifically, a drainage line 134 and a return line 136 are coupled between fuel manifold 130 and drainage reservoir 132. A fourth valve 138 is coupled along drainage line 134 and a fifth valve 140 is coupled along return line 136. Similar to valves 108, 110, and 120, controller 112 is also coupled in communication with fourth valve 138 and fifth valve 140.

In one embodiment, fuel manifold 130 is drained of fuel after engine shutdown to restrict heat transfer between combustor assembly 18 (shown in FIG. 1) and the fuel contained within fuel manifold. In a baseline configuration, first valve 108, fourth valve 138, and fifth valve 140 are in a closed position. In operation, controller 112 commands fourth valve 138 to actuate into an open position after engine shutdown such that fuel is drained into drainage reservoir 132. Controller 112 then commands first valve 108 to actuate into an open position such that drainage reservoir 132 is cooled with the cooling fluid from cooling device 104. In one embodiment, controller 112 commands first valve 108 and fourth valve 138 to actuate into the open position when controller 112 receives a full stop command or at a preset time after controller 112 receives the full stop command. Controller 112 then commands first valve 108 and fourth valve 138 to actuate into the closed position when the fuel within drainage reservoir 132 is cool. At engine restart, controller 112 commands fifth valve 140 to actuate into an open position such that the cooled fuel is channeled back into fuel manifold.

An exemplary technical effect of the systems and methods described herein includes at least one of: (a) improving the service life and reliability of components of a turbine engine; (b) limiting degradation and coking of fluids and thermal deformation of rotating components of the turbine engine; and (c) facilitates faster engine restart times.

Exemplary embodiments of a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan assemblies and related methods as described herein. Rather, the exemplary embodiment can be implemented and utilized in connection with many applications where cooling turbine engine components is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of cooling a turbine engine, the turbine engine comprising a source of air, a coolant reservoir configured to store a cooling fluid, an air separation unit coupled in flow communication with the coolant reservoir and the source of air, the air separation unit configured to receive air from the source of air, separate at least one component of air from the air to form the cooling fluid, and provide the cooling fluid to the coolant reservoir, the turbine engine further comprising a cooling device coupled in flow communication with the coolant reservoir, wherein the cooling device is configured to cool heated components of the turbine engine with the cooling fluid, a first valve configured to control a flow of the cooling fluid from the coolant reservoir towards the cooling device, a second valve positioned between the air separation unit and the coolant reservoir and configured to control flow of the cooling fluid from the air separation unit to the coolant reservoir, and a controller coupled in communication with said first valve, said method comprising:

monitoring the operational status of the turbine engine using the controller;

actuating the first valve into an open position, using the controller, after the controller receives a full stop command;

flowing cooling fluid from the coolant reservoir through the first valve and to the cooling device; and cooling the heated components of the turbine engine with the cooling fluid.

2. The method in accordance with claim 1, wherein actuating the first valve into the open position, using the controller, comprises actuating the first valve into the open position either when a rotational speed of the turbine engine decreases after the controller receives the full stop command or actuating the first valve into the open position at a preset time after the controller receives the full stop command; the method further comprising actuating the first valve into the open position, using the controller, if a temperature within the turbine engine is greater than a threshold.

3. The method in accordance with claim 1, wherein the at least one component of air separated by the air separation unit to form the cooling fluid is one of nitrogen or carbon dioxide, the method further comprising providing the cooling fluid to the coolant reservoir.

4. The method in accordance with claim 3, further comprising compressing the cooling fluid within the coolant reservoir to increase a pressure of the cooling fluid.

5. A cooling system for use with a turbine engine, said system comprising:

a coolant reservoir configured to store cooling fluid therein;

an air separation unit coupled in flow communication with said coolant reservoir, said air separation unit configured to receive a flow of air, separate at least one component of air to form the cooling fluid, and provide the cooling fluid to said coolant reservoir;

a cooling device coupled in flow communication with said coolant reservoir, wherein said cooling device is configured to cool heated components of the turbine engine with the cooling fluid;

a first valve configured to control flow of the cooling fluid from said coolant reservoir towards said cooling device;

a second valve positioned between said air separation unit and said coolant reservoir and configured to control flow of the cooling fluid from said air separation unit to said coolant reservoir; and a controller coupled in communication with said first valve, wherein said controller is configured to:

monitor an operational status of the turbine engine;

receive a full stop command to shut down the turbine engine; and actuate said first valve into an open position after receiving the full stop command to permit the cooling fluid to flow from the coolant reservoir to the cooling device to cool the heated components.

6. The cooling system in accordance with claim 5, wherein said controller is configured to actuate said first valve into the open position either when a rotational speed of the turbine engine decreases after the controller receives the full stop command or at a preset time after the controller receives the full stop command; wherein said controller is further configured to actuate said first valve into the open position if a temperature within the turbine engine is greater than a threshold.

7. The cooling system in accordance with claim 5, further comprising a third valve positioned upstream from said coolant reservoir, wherein said controller is coupled in communication with said third valve, and wherein said controller is further configured to actuate said third valve into an open position during operation of the turbine engine in order to charge the coolant reservoir with the cooling fluid.

8. The cooling system in accordance with claim 5, wherein the at least one component of air separated by the air separation unit to form the cooling fluid is at least one of nitrogen or carbon dioxide.

9. The cooling system in accordance with claim 5, wherein said coolant reservoir comprises a compression device configured to increase a pressure of the cooling fluid within said coolant reservoir.

10. A turbine engine comprising:

a source of compressed air;

a coolant reservoir, said coolant reservoir configured to store a cooling fluid therein;

an air separation unit coupled in flow communication with said coolant reservoir and said source of compressed air, said air separation unit configured to receive compressed air from said source of compressed air, separate at least one component of air from the compressed air to form the cooling fluid, and provide the cooling fluid to said coolant reservoir;

a cooling device coupled in flow communication with said coolant reservoir, wherein said cooling device is configured to cool heated components of the turbine engine with the cooling fluid;

a first valve configured to control a flow of the cooling fluid from said coolant reservoir towards said cooling device;

a second valve positioned between said air separation unit and said coolant reservoir and configured to control flow of the cooling fluid from said air separation unit to said coolant reservoir; and a controller coupled in communication with said first valve, wherein said controller is configured to:

monitor an operational status of the turbine engine;

receive a full stop command to shut down the turbine engine; and actuate said first valve into an open position after receiving the full stop command to permit the cooling fluid to flow from the coolant reservoir to the cooling device to cool the heated components.

11. The turbine engine in accordance with claim 10, wherein said source of compressed air comprises a compressor assembly configured to discharge a flow of bleed air, wherein said compressed air received by the air separation unit is the flow of bleed air.

12. The turbine engine in accordance with claim 11, wherein the at least one component of air separated by the air separation unit to form the cooling fluid is at least one of nitrogen or carbon dioxide.

13. The turbine engine in accordance with claim 10, wherein said controller is configured to actuate said first valve into the open position either when a rotational speed of the turbine engine decreases after the controller receives the full stop command or at a preset time after the controller receives the full stop command.

14. The turbine engine in accordance with claim 10, further comprising a third valve positioned upstream from said coolant reservoir, wherein said controller is coupled in communication with said third valve, and wherein said controller is further configured to actuate said third valve into an open position during operation of the turbine engine in order to charge the coolant reservoir with the cooling fluid.

15. The turbine engine in accordance with claim 10, wherein said coolant reservoir comprises a compression device configured to increase a pressure of the cooling fluid within said coolant reservoir.

16. The turbine engine in accordance with claim 15, further comprising a fuel supply system that comprises a fuel supply line coupled in flow communication with said compression device, wherein said fuel supply line is configured to pressurize said compression device.

17. The turbine engine in accordance with claim 10, further comprising a drainage reservoir configured to receive fuel from a fuel manifold of the turbine engine after the turbine engine has been shut down, wherein said cooling device is configured to cool said drainage reservoir with the cooling fluid.

* * * * *